(12) United States Patent
Saeed et al.

(10) Patent No.: US 10,927,610 B2
(45) Date of Patent: Feb. 23, 2021

(54) DOWNHOLE MOBILITY MODULE FOR LOGGING AND INTERVENTION OF EXTENDED REACH WELLS

(71) Applicants: Saudi Arabian Oil Company, Dhahran (SA); HONEYBEE ROBOTICS, LTD., New York, NY (US)

(72) Inventors: Abubaker Saeed, Dhahran (SA); Mohannad Abdelaziz, Dhahran (SA); Shazad Sadick, New York, NY (US); Jeff Shasho, New York, NY (US); Jason Herman, New York, NY (US); John Wilson, New York, NY (US); Michael Maksymuk, New York, NY (US)

(73) Assignees: Saudi Arabian Oil Company, Dhahran (SA); HONEYBEE ROBOTICS, LTD., New York, NY (US)

( * ) Notice: Subject to any disclaimer, the term of this patent is extended or adjusted under 35 U.S.C. 154(b) by 53 days.

(21) Appl. No.: 16/236,978

(22) Filed: Dec. 31, 2018

(65) Prior Publication Data
US 2019/0203544 A1  Jul. 4, 2019

Related U.S. Application Data

(60) Provisional application No. 62/611,783, filed on Dec. 29, 2017.

(51) Int. Cl.
*E21B 17/10* (2006.01)
*E21B 47/08* (2012.01)
(Continued)

(52) U.S. Cl.
CPC .......... *E21B 17/1014* (2013.01); *E21B 23/14* (2013.01); *E21B 47/08* (2013.01);
(Continued)

(58) Field of Classification Search
CPC ...... E21B 23/14; E21B 2023/008; E21B 4/18; E21B 23/001; E21B 17/1021; F16L 2101/30
See application file for complete search history.

(56) References Cited

U.S. PATENT DOCUMENTS

| 4,938,167 A | * | 7/1990 | Mizuho | ................... B08B 9/049 118/713 |
| 5,947,213 A | * | 9/1999 | Angle | ...................... E21B 4/18 166/250.01 |

(Continued)

FOREIGN PATENT DOCUMENTS

| DE | 19746511 A1 | * | 4/1999 | ............. G01N 29/22 |
| EP | 1373783 A2 | | 1/2004 | |
| WO | WO 2016/085484 A1 | | 6/2016 | |

*Primary Examiner* — Jennifer H Gay
(74) *Attorney, Agent, or Firm* — Leason Ellis LLP

(57) ABSTRACT

A robotic device and mobility module for navigating through a passageway whose diameter may vary comprises a central support member, a first casing coupled to the elongate support member via a first expandable and collapsible linkage, the first casing having an external surface including a first movable track, and a second casing coupled to an opposite side of the elongate support member from the first casing, the second casing coupled to the elongate support member via a second expandable and collapsible linkage and including an external surface including a second movable track.

16 Claims, 5 Drawing Sheets

(51) Int. Cl.
*E21B 47/09* (2012.01)
*E21B 23/14* (2006.01)
*E21B 47/13* (2012.01)
*F16L 101/30* (2006.01)
*E21B 23/00* (2006.01)

(52) U.S. Cl.
CPC .............. *E21B 47/09* (2013.01); *E21B 47/13* (2020.05); *E21B 23/001* (2020.05); *F16L 2101/30* (2013.01)

(56) References Cited

U.S. PATENT DOCUMENTS

| | | | |
|---|---|---|---|
| 6,026,911 A | 2/2000 | Angle et al. | |
| 6,112,809 A * | 9/2000 | Angle | E21B 4/18 166/50 |
| 6,282,452 B1 | 8/2001 | DeGuzman et al. | |
| 6,378,627 B1 * | 4/2002 | Tubel | E21B 4/18 175/24 |
| 6,431,270 B1 | 8/2002 | Angle | |
| 7,156,192 B2 * | 1/2007 | Guerrero | E21B 23/14 175/51 |
| 7,210,364 B2 * | 5/2007 | Ghorbel | F16L 55/26 73/865.8 |
| 7,222,682 B2 * | 5/2007 | Doering | F16H 7/06 175/106 |
| 7,334,642 B2 * | 2/2008 | Doering | E21B 4/18 166/206 |
| 7,363,989 B2 * | 4/2008 | Ueland | F16L 55/30 175/106 |
| 7,770,667 B2 * | 8/2010 | Moore | E21B 4/04 166/216 |
| 9,097,086 B2 * | 8/2015 | AlDossary | E21B 23/14 |
| 9,874,061 B2 * | 1/2018 | Bedrossian | E21B 44/005 |
| 2003/0173076 A1 * | 9/2003 | Sheiretov | B66F 3/22 166/241.1 |
| 2003/0183383 A1 * | 10/2003 | Guerrero | E21B 17/1021 166/206 |
| 2004/0168828 A1 * | 9/2004 | Mock | E21B 4/18 175/51 |
| 2005/0034874 A1 * | 2/2005 | Guerrero | E21B 23/14 166/380 |
| 2005/0145415 A1 * | 7/2005 | Doering | E21B 4/18 175/24 |
| 2005/0263325 A1 * | 12/2005 | Doering | E21B 23/14 175/106 |
| 2006/0180318 A1 * | 8/2006 | Doering | E21B 23/14 166/384 |
| 2007/0209806 A1 * | 9/2007 | Mock | E21B 4/18 166/382 |
| 2008/0149339 A1 * | 6/2008 | Krueger V | E21B 23/04 166/301 |
| 2008/0202769 A1 * | 8/2008 | Dupree | E21B 4/18 166/382 |
| 2008/0308318 A1 * | 12/2008 | Moore | E21B 4/18 175/51 |
| 2009/0236101 A1 * | 9/2009 | Nelson | E21B 4/18 166/382 |
| 2011/0073300 A1 * | 3/2011 | Mock | E21B 4/18 166/212 |
| 2013/0068479 A1 * | 3/2013 | AlDossary | E21B 23/14 166/381 |
| 2015/0041137 A1 | 2/2015 | Rodriguez | |
| 2016/0362953 A1 * | 12/2016 | Bedrossian | E21B 23/00 |
| 2019/0203544 A1 * | 7/2019 | Saeed | E21B 47/08 |

* cited by examiner

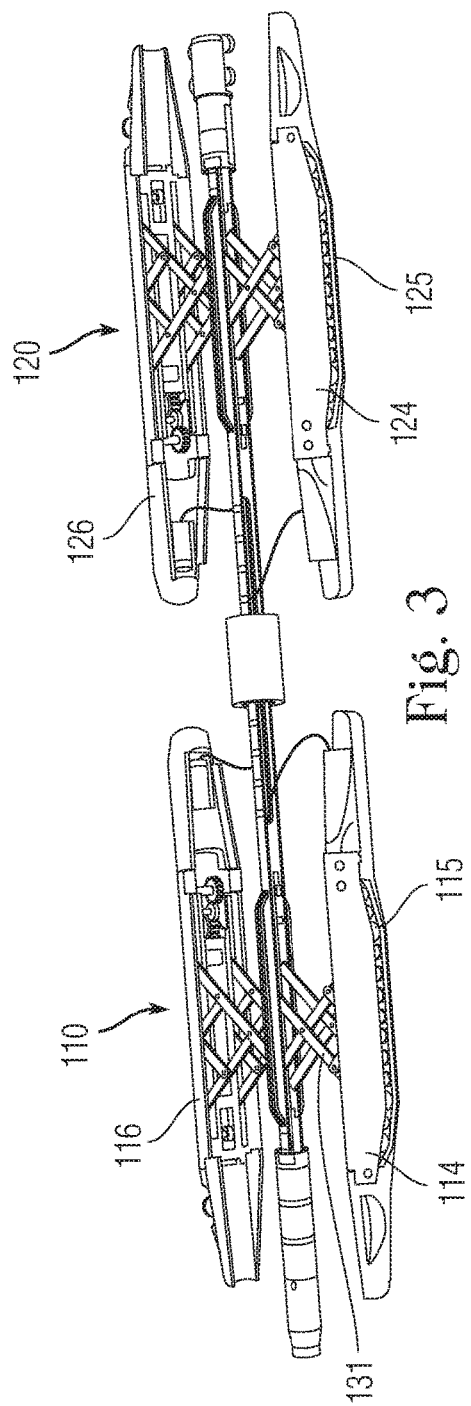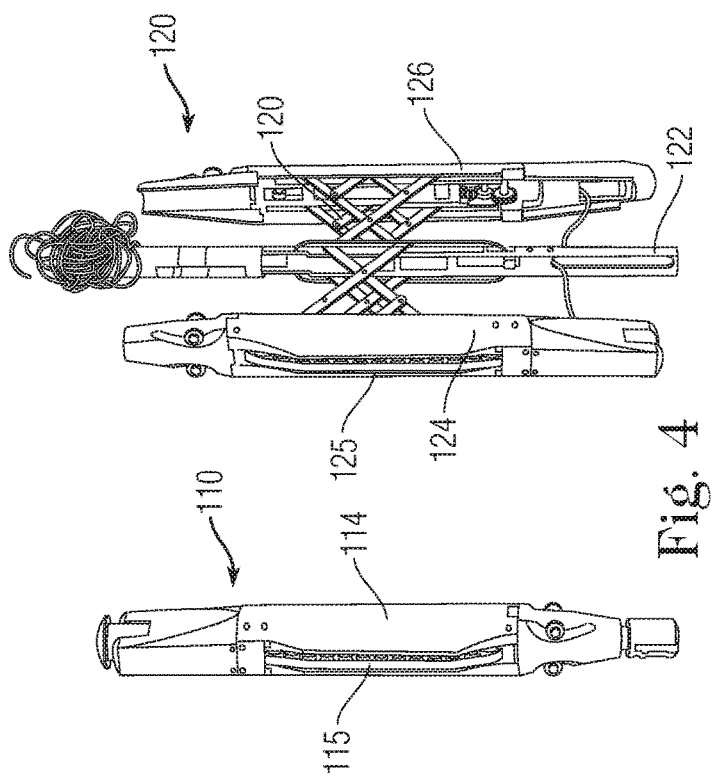

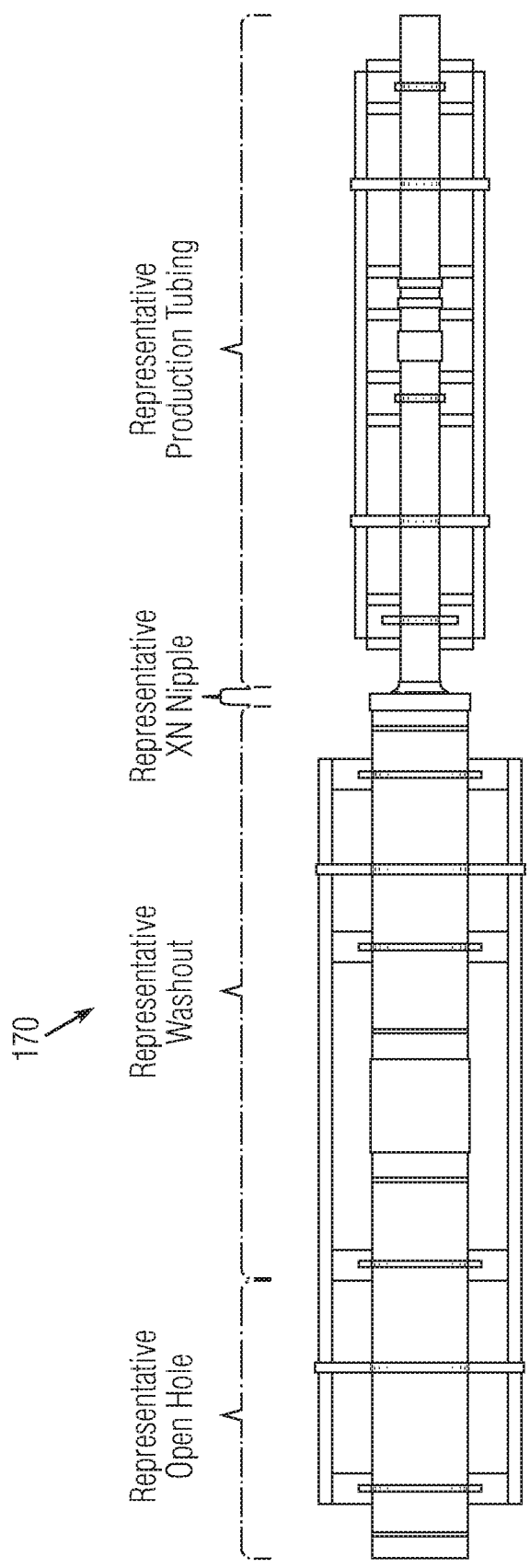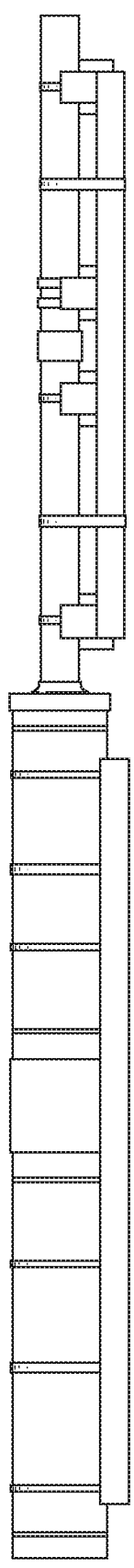
Fig. 6A
Fig. 6B

DOWNHOLE MOBILITY MODULE FOR LOGGING AND INTERVENTION OF EXTENDED REACH WELLS

FIELD OF THE INVENTION

The present invention relates to monitoring oil and gas production wells, and in particular relates to an autonomous robotic device (mobility module) having the ability to successfully navigate through production tubing, and other deep well passageways, of varying diameters for the purposes of logging and intervention.

BACKGROUND OF THE INVENTION

As oil and gas is extracted from deeper and more complex lateral production wells, it becomes a challenge to obtaining reliable data or if necessary, to conduct interventions, at extended downhole depth and/or lateral reach. To date, robotic devices have been employed in monitoring oil and gas production tubing in less complex production facilities. However, the robotic devices employed thus far have relied on passive suspension and have only proven capable of navigating production tubing that have minor diameter changes and systems that do not contain laterals.

What is therefore needed is an apparatus that enables navigation through production tubing and other deep well passageways of varying diameters and though lateral wells.

SUMMARY OF THE INVENTION

Embodiments of the present invention provide a mobility module for navigating through a passageway having a varying diameter. The mobility module comprises a central support member, a first casing coupled, for instance, at an inner surface, to the elongate support member via a first expandable and collapsible linkage, the first casing having an external surface including a first movable track, and a second casing coupled, for instance, at an inner surface, to an opposite side of the elongate support member from the first casing, the second casing coupled to the elongate support member via a second expandable and collapsible linkage and including an external surface including a second movable track. The first and second linkages of the respective casings collapse fully to size the mobility module for unimpeded movement in a well and expand fully to size the mobility module for fixed engagement with the well.

Embodiments of the present invention also provide a robotic device for navigating through a passageway having a varying diameter. The robotic device comprises at least two mobility modules. Each of the mobility modules includes a central support member, a first casing coupled, for instance, at an inner surface, to the central support member via a first expandable and collapsible linkage, the first casing having an external surface including a first movable track, and a second casing coupled, for instance, at an inner surface, to an opposite side of the central support member from the first casing, the second casing coupled to the central support member via a second expandable and collapsible linkage and including an external surface including a second movable track. The at least two mobility modules are pivotably coupled to and positioned longitudinally with respect to each other. The linkages of the at least two mobility modules collapse fully to size the modules for unimpeded movement in a well and expand fully to size the modules for fixed engagement with the well. Embodiments of the invention can be equipped with tools for logging or intervention.

BRIEF DESCRIPTION OF THE DRAWINGS

FIG. 3 is a photograph showing two opened mobility modules according to an embodiment of the present invention in a parallel configuration.

FIG. 4 is a photograph showing the mobility modules of FIG. 3 separated from each other.

FIG. 6A is a schematic top view of the test stand apparatus shown in FIG. 5.

FIG. 6B is a schematic side view of the test stand apparatus shown in FIG. 5.

DETAILED DESCRIPTION CERTAIN OF EMBODIMENTS OF THE INVENTION

The disclosure herein pertains to mobility modules used for navigating through passageways of varying diameter, and to robotic devices that can include one or more of such modules for use in logging and intervention in oil and gas production facilities. In some embodiments, a robotic device according to the present invention can include multiple mobility modules. The mobility modules are arranged linearly and can be angularly clocked to one another.

Figure 1:
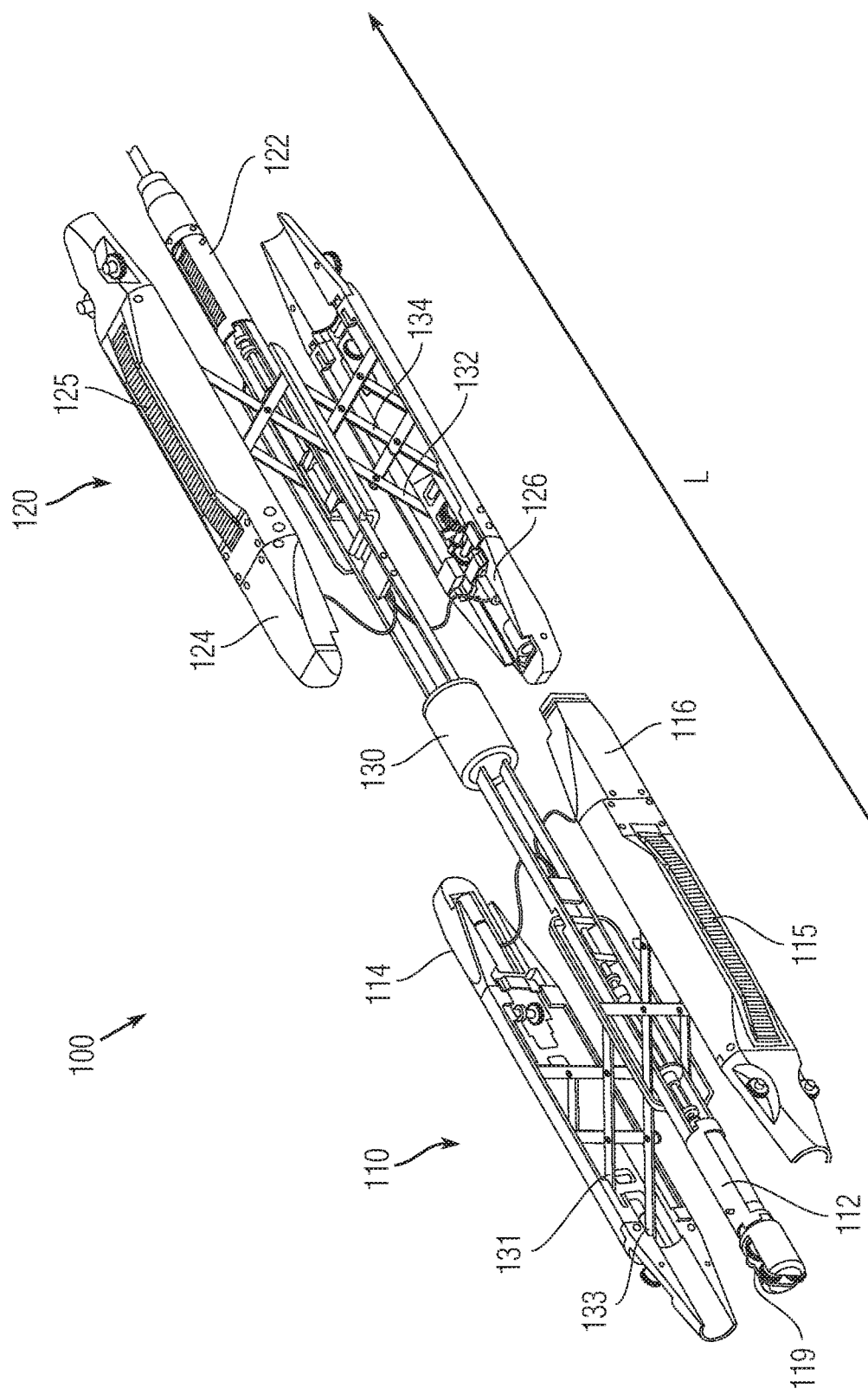
FIG. 1 is a side perspective view of a robotic device including two mobility modules according to an embodiment of the present invention.

FIG. 1 is a side perspective view of a robotic device 100 including two mobility modules 110, 120 according to an embodiment of the present invention. It is to be appreciated that while two mobility modules are shown in the example embodiment, the robotic device can include multiple modules without any set limitation on their number. In FIG. 1, the first mobility module 110 includes a central support member 112 that is surrounded by an expandable and collapsible housing consisting of first and second casings 114, 116. The support member 112 and first and second casings 114, 116 are generally elongated in the longitudinal direction (L). The first and second casings 114, 116 can be tapered at each longitudinal end as shown in FIG. 1. The first and second casings 114, 116 are movable laterally (perpendicularly to axis L) with respect to the support member using one or more linkages 131, 133 that is coupled between the central support 112 and casings 114, 116. The linkages 131, 133 can be activated by a motor (not shown) to move the casings 114, 116 from a fully closed position, in which the casings 114, 116 come into contact and fully enclose the support member 112, to a fully open position defined by the limit of the extension of the linkages 118. Generally, the first and second linkages of the respective casings collapse fully to size the mobility module for unimpeded movement in a well and expand fully to size the mobility module for fixed engagement with the well, in a particular application of the inventive mobility module in which the mobility module can be employed for logging and intervention of extended reach wells. In some embodiments, in the fully closed position, the diameter of the mobility module is about 2.5 to about 3 inches, and in the fully open position, the diameter of the mobility module is about 8.5 to about 9.5 inches. The linkages 131, 133 can be positioned at any intermediate position between the fully open and closed position. Accordingly, in the particular embodiment described, via control of the linkages, mobility module 110 can be configured to have a diameter ranging from a lower limit of 2.5 inches to an upper limit of 9.5 and any diameter in between. The flexible and modifying setting of the diameter of the mobility module enables the module to collapse for navigating narrow passages ways or obstructions, and expand to enable navigation through comparatively wide passageways such as washouts.

Casings 114, 116 include movable tracks e.g., 115 (shown for casing 114), that can be implemented using belts, chains or linear actuator similar mechanisms. The tracks e.g., 115 are configured to movably contract toward the inner surfaces of the passageways in which the mobility module is positioned, and to enable the mobility module to move forwards and backwards in the longitudinal direction (L) through passageways. In addition, in certain embodiments the support member includes wheels 119 at its longitudinal ends. The wheels 119 are lead-in features that guide the mobility module smoothly into smaller diameters. In some embodiments the casings 114, 116 can include additional wheels (either activatable or passive) for facilitating smooth transitions between passages of varying diameters.

Second mobility module 120 includes similarly includes an elongate central support member 122, first and second elongate casing elements 124, 126 and linkages 132, 134 coupled between the support member 122 and casings 124, 126. Casings 124, 126 include track elements, e.g., 125 and support member wheels (not shown in FIG. 1). Second mobility mobile 120 is able to expand and collapse in a similar manner as first mobility module 110. It is to be appreciated that each of the mobility modules 110, 120 can be driven to expand or collapse separately.

In robotic device 100, the first and second mobility modules 110, 120 are positioned longitudinally with respect to each other and are coupled to each other via a pivotable coupling 130. Pivotable coupling 130 allow the mobility mobiles to be rotated at various angles with respect to each other around the longitudinal axis (L). Additional mobility modules can be coupled to the robotic device 100 longitudinally in a similar manner to form a longitudinally extended device. It is to be appreciated that the multiple mobility modules in a robotic device can be spaced apart by similar distances, or alternatively, they can be spaced apart by different distances using intermediate spacer elements. In the example shown in FIG. 1, first mobility module 110 is oriented such that casings 114, 116 expand and collapse in a horizontal direction (into and out of the page). In contrast, second mobility module 120 is oriented at a 90 degree angle with respect to the first mobility module 110, such that casings 124, 126 expand in a vertical direction. It is to be appreciated that mobility modules 110, 120 can be oriented at other angles (e.g., 30°, 45°, 60°) with respect to each other. The varying angular orientation of the mobility modules 110, 120 can support rotational stability. In some embodiments in which more than 2 mobility modules are employed, the modules can be arranged in a regular angular arrangement (i.e., "clocked") with respect to each other.

Figure 2B:
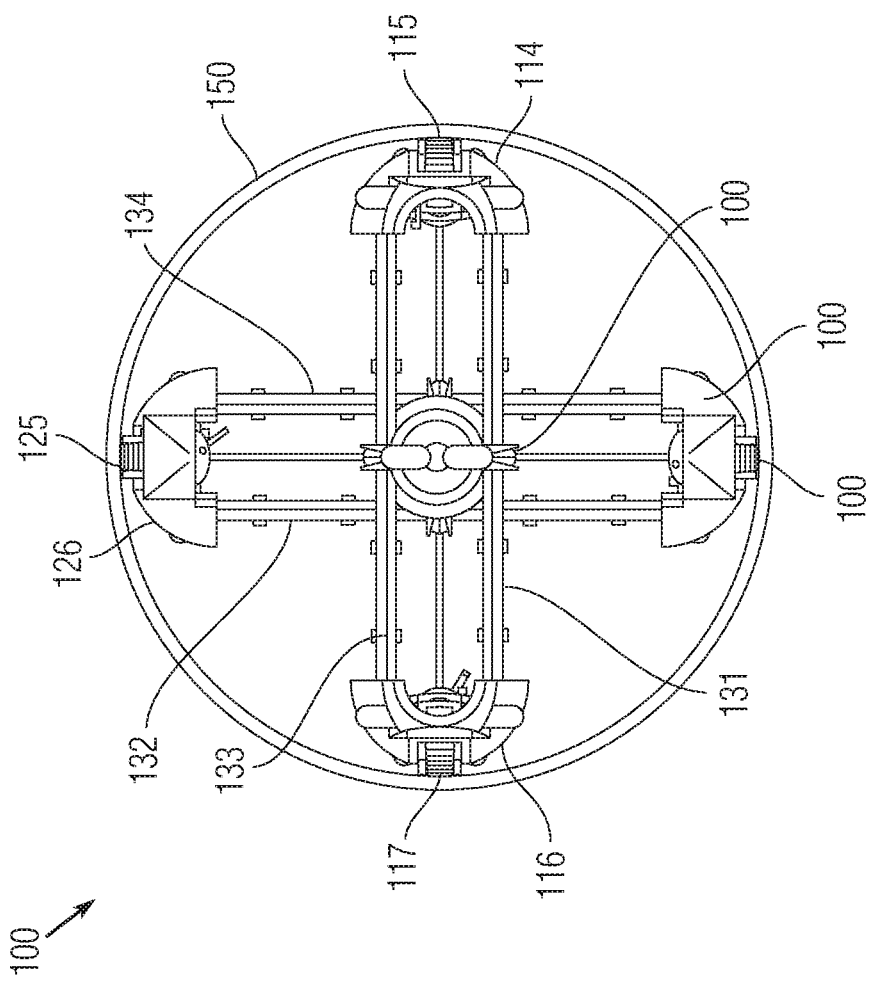
FIG. 2B is an end plan view of a mobility module in a fully opened position according to an embodiment of the present invention.
Figure 2A:
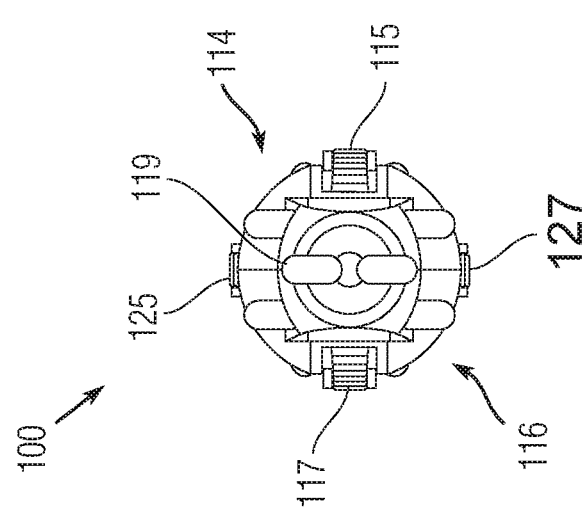
FIG. 2A a front end view of a mobility module in a closed position according to an embodiment of the present invention.

FIG. 2A is a front end view of the robotic device 100 of FIG. 1 with both mobility modules 110, 120 in a fully collapsed configuration. In this view, the casings of the first mobility module 114, 116 are shown in a closed position, fully enclosing the support member. Movable tracks 115, 117 are shown positioned on the left and right side of the device. Front wheels 119 are also shown. In this view the casings of the second mobility module 120 cannot be seen as they are positioned behind the casings 114, 116 of the first mobility module, but the movable tracks 125, 127 of the second mobility module are not obscured and are shown at the top and bottom of the device. In this configuration, the robotic device is able to negotiate and navigate through small passage and obstacles such as XN nipples.

FIG. 2B a front end view of the robotic device 100 of FIG. 1 with both mobility modules 110, 120 as shown in a fully expanded configuration within an exemplary tube 150. The first mobility module 110 is fully expanded in a horizontal orientation. The first casing 114 of the first mobility module is shown fully extended rightwardly via two linkages 131, 133. Movable track 115 is shown in substantial contact with the inner surface of tube 150. The second casing 116 of the first mobility module is shown fully extended leftwardly via linkages 131, 133. Movable track 117 is shown in substantial contact with the inner surface of tube 150.

Similarly, the second mobility module is fully expanded in a vertical orientation. The first casing 124 of the second mobility module is shown fully extended upwardly via two linkages 132, 134. Movable track 125 is shown in substantial contact with the inner surface of tube 150. The second casing 126 of the second mobility module is shown fully extended downwardly via linkages 132, 134. Movable track 127 is also shown in substantial contact with the inner surface of tube 150.

In the configuration shown in FIG. 2A, the robotic device is able to move longitudinally within tube 150 by activation of one or more of the movable tracks of the first and second mobility modules 115, 117, 125, 127.

FIG. 3 is a photograph is a photograph showing two opened mobility modules 110, 120 as described above in a parallel configuration. FIG. 4 is a photograph showing the mobility modules 110, 120 of FIG. 3 disconnected from each other.

Figure 5:
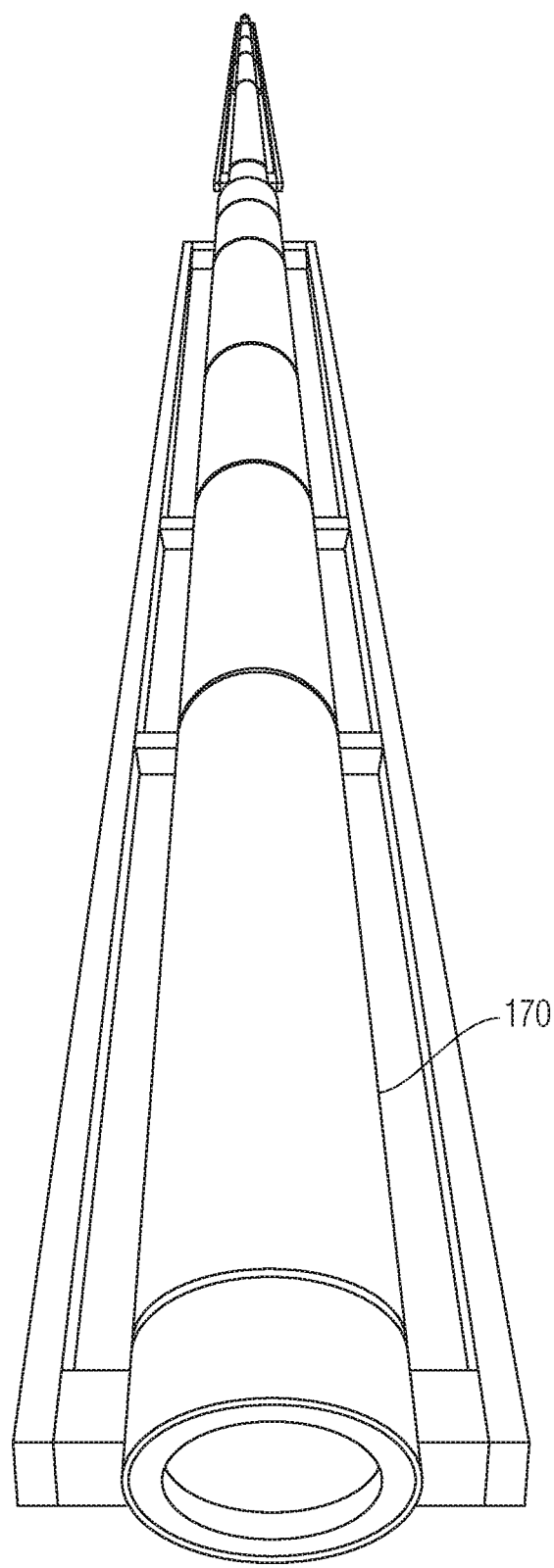
FIG. 5 is a photograph of a test stand apparatus used to test the ability of the mobility module to navigate through tubing of varying diameter.

FIG. 5 is a photograph of an exemplary test apparatus 170 used to test the ability of the robotic device according to the present invention to navigate through tubes of varying diameter. FIG. 6A is a schematic top view of the test apparatus 170 and FIG. 6B is a schematic side view of the test apparatus. In FIG. 6A, various section of the test apparatus 170 are delineated. The section at the far right is a section of representative production tubing and has a diameter of about 4 inches. Two sections at the left of the apparatus are designated as open hole and representative washout sections which a diameters of about 9 inches. Positioned between, and coupling the representative washout section and the representative production tubing section is a constricted section referred to as an XN nipple. This section has a comparatively smaller diameter of about 2.7 inches.

In various tests using the apparatus of FIGS. 5, 6A and 6B, the robotic device including two mobility modules according to the present invention passed successfully in tests through 4" diameter production pipe, XN nipples of about 2.7" diameter, washout of 9" diameter and open-holes. It is expected that in deploying a robotic device according to the present invention in various downhole passageways, that the device can encounter passageway sections that are too wide for any of the mobility modules to establish contact and traction with the passageway walls. By extending the robotic device longitudinally using multiple mobility modules, at least one of mobility modules in the extended device will more likely be positioned in a narrower passageway section (e.g., having a diameter less than 9") and be able to provide locomotion for the robotic device as a whole.

The robotic device can include an electronic control unit activates the movable tracks to control longitudinal motion of the device through the various passageways in the production system. The electronic control unit can also activate the linkages to expand or collapse the casings of the device as suitable for the passageway being navigated. To this end, the robotic device can include tools such as sensors (e.g., pressure, inertial and GPS sensors) that provide data from which signals can be generated by the electronic control unit which can determine the local dimensions of the passageway the device is traversing, can and can activate the linkages to navigate the passageways accordingly. The sensors also detect conditions within the well for monitoring purposes. This data can be recorded and then delivered wirelessly, and comparisons to thresholds or changes in the gathered information can be processed locally onboard the mobility module or in conjunction with communications to a remote computing system programmed with code for that purpose. The tools can be mounted to the mobility module in a conventional way, such as in connection with a collar supported by the central support member. The robotic device can include an on-board power supply such as a battery. The electronic control unit can adjust power requirements so as to conserve battery power. The robotic device of the present invention can include a communication module for wireless communication with operators. Some or all of the functions performed by the electronic control unit can be determined or adjusted by operators through wireless commands.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mobility module for navigating through a passageway having a varying diameter comprising:
   a central support member including first and second longitudinal ends positioned at longitudinal extremities of the module taken as a whole;
   first and second expandable and collapsible linkages movable at least radially relative to the central support member;
   a first casing coupled to the central support member via the first expandable and collapsible linkage, the first casing having an external surface including a first movable track;
   a second casing coupled to an opposite side of the central support member from the first casing, the second casing coupled to the central support member via the second expandable and collapsible linkage and including an external surface including a second movable track; and
   wheels rotatably mounted on the central support member adjacent to the at least one of the first and second longitudinal ends.

2. The mobility module of claim 1, wherein a diameter of the module from the external surface of the first casing to the external surface of the second casing, when the first and second linkages are collapsed fully, is sized to permit unimpeded movement in a well while the diameter of the module when the linkages are expanded fully is sized to engage the well and restrict movement of the mobility module.

3. The mobility module of claim 1, wherein a diameter of the module from the external surface of the first casing to the external surface of the second casing when the first and second linkages are expanded fully is in the range of 8.5 inches to 9.5 inches.

4. The mobility module of claim 1, wherein a diameter of the module from the external surface of the first casing to the external surface of the second casing when the first and second linkages are collapsed fully is in the range of 2.5 inches to 3 inches.

5. The mobility module of claim 1, wherein the first and second casings are elongated longitudinally and include tapered longitudinal ends.

6. The mobility module of claim 1, wherein the first and second movable tracks further comprise at least one of a belt or chain.

7. The mobility module of claim 1, further comprising an electronic control unit and a wireless communication module, wherein the first and second linkages and the first and second movable tracks are controlled by the electronic control unit, and wherein the electronic unit is operative to receive operator commands via the wireless communication module to control the first and second linkages and the first and second movable tracks.

8. A robotic device for navigating through a passageway having a varying diameter comprising:
   at least two mobility modules positioned longitudinally with respect to each other, each of the at least two mobility modules including a central support member including first and second longitudinal ends positioned at longitudinal extremities of the module taken as a whole, a first casing coupled to the first central support member via a first expandable and collapsible linkage, the first casing having an external surface including a first movable track, and a second casing coupled to an opposite side of the first central support member from the first casing, the second casing coupled to the first central support member via a second expandable and collapsible linkage and including an external surface including a second movable track; and wheels rotatably mounted on the central support member adjacent at least one of the longitudinal ends, wherein each of the at least two modules is coupled longitudinally to at least one other mobility module via a pivotable coupling.

9. The robotic device of claim 8, wherein the at least two mobility modules comprises more than three mobility modules.

10. The robotic device of claim 8, wherein the at least two mobility modules each have a diameter measured from the external surface of a respective first casing to the external surface of a respective second casing, wherein the first and second linkages of the respective casings collapse fully to size the first and second mobility modules for unimpeded movement in a well and expand fully to size the first and second mobility modules for fixed engagement with the well.

11. The robotic device of claim 8, wherein a diameter of the at least two mobility modules from the external surface of the first casing to the external surface of the second casing when the first and second linkages are expanded fully is 8.5 inches to 9.5 inches.

12. The robotic device of claim 8, wherein a diameter of the at least two mobility modules from the external surface of the first casing to the external surface of the second casing when the first and second linkages are collapsed fully is 2.5 inches to 3 inches.

13. The robotic device of claim 8, wherein the first and second casings of the at least two mobility modules are elongated longitudinally and include tapered longitudinal ends.

14. The robotic device of claim 8, wherein the first and second movable tracks of the at least two mobility modules include at least one of a belt or chain.

15. The robotic device of claim 8, further comprising an electronic control unit and a wireless communication module, wherein the at least two mobility modules are controlled by the electronic control unit, and the electronic unit is operative to receive operator commands via the wireless communication module to control the at least two mobility modules.

16. The mobility module of claim 8, wherein the at least one mobility module is provides longitudinal locomotion through the passageway via the first and second movable tracks when at least one of the at least two mobility modules is in contact with a wall of the passageway.

* * * * *